3,226,421
CATALYTIC PROCESS FOR THE PREPARATION OF NITRILES
Nicola Giordano, Giorgio Caporali, and Natale Ferlazzo, Milan, Italy, assignors, by mesne assignments, to Edison, Milan, Italy, a corporation of Italy
No Drawing. Filed July 11, 1962, Ser. No. 209,219
Claims priority, application Italy, July 14, 1961, 13,163/61, Patent 682,880
3 Claims. (Cl. 260—465.3)

The present invention relates to a novel process and catalyst for the manufacture of nitriles. More particularly, the invention is concerned with an improved process for the manufacture of unsaturated nitriles utilizing catalysts containing a heteropoly compound.

Various methods of preparing unsaturated nitriles have been proposed and utilized envolving the reaction of an olefin with ammonia and oxygen in the presence of a specific catalyst. The known catalysts utilized in such methods have included several elements and combinations thereof mainly in the form of their oxides. Among such elements are for example: bismuth, tin and antimony salts of molybdic, phosphomolybdic and phosphotungstic acids, molybdenum, cobalt, and tellurium oxides; mixtures of molybdenum and tellurium oxides; tellurium oxide; mixtures of tungsten and tellurium oxides; mixture of molybdenum and chromium oxides; mixtures of molybdenum, arsenic and bismuth oxides; various combinations of molybdenum, vanadium, chromium, manganese, cobalt, nickel, copper, iron, tellurium, selenium, bismuth, silver, gold and aluminum oxides; phosphoric acids activated by the metallic elements and combination thereof; compounds of bismuth, phosphorus, oxygen and vanadium, manganese, chromium, iron, cobalt, nickel.

In general, the known processes have not proven entirely satisfactory. One of the principle disadvantages of the known processes is relatively low selectivity, i.e., low yields of the desired unsaturated nitrile, coupled with the formation of large amounts of carbon oxides and undesired by-products, e.g., unsaturated aldehydes, acids, ketones, saturated nitriles, hydrogen cyanide. The by-products, of course, represent a loss of substance, and of particular importance interfere with recovery of the desired pure unsaturated nitriles.

A further disadvantage of the known processes is the relatively low conversion of the feed and olefin per pass resulting, among other things, in lowered catalyst efficiency often requiring recycle of the reactants.

An additionad disadvantage of the known processes resides in the fact that ammonia, in the presence of the known catalysts and at normal operational temperatures tends to enter into numerous side reactions, consequently large amounts of ammonia are necessary with respect to the olefin to have good selectivity.

A further disadvantage of the known processes is the relatively long contact time required to obtain a satisfactory conversion of the feed.

Still a further disadvantage of the known processes is the relatively short catalyst life necessitating frequent regeneration of the catalysts.

In accordance with the present invention, aliphatic unsaturated nitriles are produced in substantialy quantitative amounts by reacting an olefin with oxygen and ammonia without the attendant disadvantages of the known processes. Accordingly, it is an object of the present invention to provide a process and catalyst for the manufacture of unsaturated nitriles in higher yields than hitherto obtainable.

Still a further object of the invention is to provide a process and a catalyst which allow high conversions per pass with relatively short contact time and without impairing the selectivity of the reaction.

Still a further object of the invention is to provide a process and a catalyst in which the maximum utilization of the ammonia feed is obtained avoiding the formation of undesired by-products.

Still a further object of this invention is to provide a novel catalyst which may be reused repeatedly without appreciable loss of activity, hence not requiring frequent regeneration.

The process according to the present invention offers considerable advantages over the known processes. In fact, it has been found that utilizing the new catalytic complexes of this invention, it is possible to obtain high conversions of the olefins without reducing the yield of unsaturated nitriles formed by the reaction.

A particularly important advantage of the process resides in the high degree of selectivity exhibited by the catalysts of the invention. The term "selectivity" is used in the sense that few side reactions occur, hence only extremely small amounts of side products and carbon oxides are obtained.

The absence of side reactions, which are highly exothermic in character, enables relatively simple temperature control during the reaction process thus avoiding the necessity of any specific measures for dissipating the intense reaction heats. It is readily observable that such an advantage results in an ease of operation heretofore unknown in the art.

A further advantage resides in the high conversions that are obtained utilizing the catalytic process of this invention.

Still a further advantage of the inventive process lies in the high resistance of the catalyst to deactivation, in consequence whereof the catalysts, according to the invention, exhibit relatively long life without any appreciable loss of activity.

According to the present invention there is provided a process for obtaining an unsaturated nitrile which comprises reacting an olefinic hydrocarbon in the gaseous phase with gaseous ammonia and gaseous oxygen, or oxygen containing gases, wherein the gaseous reactants are passed over a catalytic complex (discussed hereinafter) at temperatures within the range of about 300° to 600° C. and, under substantially normal atmospheric pressures.

The catalytic complexes of this invention may be regarded as the reaction product of at least one heteropolyacid with tellurium. As it is known, heteropolyacids are considered to be derived from two or more molecules of two or more different acids by elimination of water, more particularly they may be regarded as formed by the union of a varying number of acid anhydride molecules, especially $MoO_3$ (usually defined as coordinated elements with a second acid which furnishes the central atom usually defined as coordinating element) of such a polyanionic complex (see Kirk-Othmer "Encyclopedia of Chemical Technology," vol. 7, page 458 and following, New York, 1951).

The heteropolyacids of our catalytic complexes have as coordinating element at least one element of the rare earths of the lanthanide and actinide series and have as the coordinated element molybdenum, they are for example ceriomolybdic acid, lanthanomolybdic acid and thoriomolybdic acid.

More particularly the heteropolycompounds which constitute the catalysts according to the invention may be more precisely defined by the following generic formulae:

(a) $Te_xCe_yMo_zO_q$ where
  $x$ represents a number in the range between about 20 and about 1800
  $y$ represents a number in the range between about 1 and about 100 z represents a number in the range between about 40 and about 2400 q assumes certain values in the range between about 140 and about 12900

(b) $Te_xLa_yMo_zO_q$ where x represents a number in the range between about 20 and about 1800 y represents a number in the range between about 1 and about 100 z represents a number in the range between about 40 and about 2400 q assumes certain values in the range between about 140 and about 12900

(c) $Te_xTh_yMo_zO_q$ where x represents a number in the range between about 20 and about 1800 y represents a number in the range between about 1 and about 100 z represents a number in the range between about 40 and about 2400 q assumes certain values in the range between about 140 and about 12900

The catalytically active heteropolycompounds may be employed alone or in admixture with each other. The heteropolycompounds have proved effective as such, as well as admixed with a suitable support. In addition, it was surprisingly discovered that they are effective when utilized in a fixed or in a fluid bed process.

The process of the present invention may be utilized with aliphatic olefins having linear or branched chains, at least three carbon atoms and at least one methyl group in the γ-position with respect to the double bond. The process is particularly effective, producing excellent yields, when propylene is used to produce acrylonitrile, or when isobutylene is used to produce methacrylonitrile.

The olefins may be employed in the pure state; however, it has been found that the reaction takes place as well when diluted with paraffinic hydrocarbons which do not react under the process conditions and behave in all respects as inert diluents.

The oxygen necessary for the reaction may be supplied in the pure state or in the form of gases which contain it, e.g., air. This latter embodiment offers certain advantages because the nitrogen accompanying the oxygen, serves usefully as a diluent, as will be discussed hereinafter.

Because of the exothermic character of the reaction, it may be necessary or useful to dilute the reactants with inert gaseous substances. Examples of inert substances found suitable for use in the process of this invention, to mention a few, are: paraffinic hydrocarbons, which includes those that may already be mixed with the raw olefin used; nitrogen; carbon dioxide; steam; etc.

As mentioned hereinbefore, the use of air in the process supplies nitrogen which acts as an inert diluent. Further, the olefin itself, when used in excess, acts as an inert diluent.

The type, use, quantity, etc. of diluents in the process of this invention, will, of course, depend on several factors, for example: reaction conditions; extent of conversion achieved, hence, the amount of heat developed; the selectivity, in the sense that where there is a low selectivity, the main reaction is accompanied by side reactions that are more exothermic in character than the main reaction, to the end that higher amounts of diluent are required to control the process temperature; and technique used, viz., fixed or fluid bed, apparatus, etc.

Because of the very high selectivity of the catalyst utilized in the invention, which strongly inhibits exothermic side reactions, the use of a supplementary diluent in the feed may be kept rather low or altogether omitted when using air in that the nitrogen present in air is usually sufficient to control the exothermicity of any side reactions.

The quantity of oxygen or oxygen containing gas employed with respect to the olefin employed may vary within wide limits. It is pointed out, however, that an excess of oxygen with the olefin may form an explosive mixture; while on the other hand, a deficiency of oxygen may result in a limited conversion of the olefin.

In the preferred embodiment, the molar ratio of oxygen: olefin is within the range of about 0.5:1 and about 2.5:1. The quantity of ammonia to be used in proportion to the olefin may vary within wide intervals. However, the preferred molar ratio between ammonia and olefin is within the range of about 0.3:1 and about 2:1.

In order to effect the highest utilization of ammonia, its quantity should be sufficient to effect completion of the reaction; on the other hand, a great excess of ammonia results in waste of the ammonia.

It has been observed that, while certain gaseous mixtures of olefin, oxygen and ammonia characterized by specific component ratios may behave as explosive mixtures, the process of this invention is operative within the limits represented by such explosive mixtures.

The high selectivity of the catalysts of this invention allows the maximum possible exploitation of the ammonia present in the reaction, so that only a slight excess of ammonia with respect to the reacting olefin, is required to insure complete reaction.

While the reaction is usually carried out at atmospheric pressure with excellent results, it may also be carried out at pressures higher than atmospheric. In addition, while the reaction may be carried out at temperatures within the range of from about 300° to 600° C., temperatures in the range from 400° to 550° C. are preferred for the reason that, at these temperatures, the reaction rate is so fast that high conversions are attained at relatively short contact times, as will be discussed hereinafter and illustrated by accompanying examples.

The contact time (expressed as the time during which a unit volume of the fed gaseous mixture, measured under the mean temperature and pressure conditions existing in the reactor, comes into contact with an apparent unit volume of catalyst) may vary within wide limits, e.g. from 0.05 to 20 seconds, but it has been found, due to the high activity of the catalyst, that contact times of less than one second are sufficient to obtain a high conversion, so that the preferred range for carrying out the process according to the present invention is between about 0.1 and 3 seconds.

The heteropolycompounds used as catalysts in the process of this invention may be obtained in the following way: The ammonium salt of the selected heteropolyacid is prepared following the known procedures described in the technical literature. This ammonium heteropoly salt is then reacted with a compound of the salifying element desired in the presence of a small quantity of a strong acid and of a liquid reaction medium.

In accordance with this invention, the compounds containing the salifying element are salts of organic or inorganic acids of Te, and preferably nitrates of Te, soluble in at least one solvent chosen from the class comprising water, alcohols, ethers and esters.

The two reactants, that is, the heteropoly salt of ammonia and the compound of the salifying element, are made to react in a stoichiometric ratio so as to obtain, as the product of the reaction, the heteropoly salt of the desired element. It is preferred to use one of the reactants in excess and, in particular, an excess of the compound of the salifying element. In any event, the catalysts prepared using an excess of one of the reactants fall within the limits set by the above mentioned formulae.

When the water solubility of the heteropoly salt of ammonia is sufficiently high, resulting in solutions of relatively high concentration, the reaction may be effected between the aqueous solution of heteropoly salt of ammonia and the solution of the salifying element. When, however, the solubility in water of the heteropoly salt of ammonia is low and solutions of high concentration cannot be obtained, the reaction may readily be carried out between the aqueous suspension of said heteropoly salt of ammonia and the aqueous solution of the compound of the salifying element.

In certain cases it has been found to be convenient to effect the reaction between the heteropoly salt of ammonia and the compound of the salifying element in the presence of non-aqueous solvents such as organic solvents containing oxygen, particularly alcohols, ethers, esters, etc.

In order to obtain catalysts in accordance with the invention having particular activity and effectiveness, it has been found useful to carry out the reaction between heteropoly salt of ammonia and the compound of the salifying element in the presence of strong mineral acids, particularly nitric acid. The conditions under which this reaction is carried out (temperature, stirring, sequence of addition of the reactants) are not critical for obtaining the catalysts employable in the process of this invention.

Dependent upon the solvent used, the desired heteropolycompound is obtained either in the form of a precipitate suspended in the reaction solvent or in the form of a solution in the reaction solvent.

Where it is desired to use a catalyst as such, that is, without a support, the resulting reaction product is evaporated to dryness for instance by heating it at 100° C. with subsequent activation. Activation consists in heating the catalyst to a temperature of from 400° C. to 600° C. for a period of from 5 to 20 hours. The activation temperature must be equal to or greater than the temperature at which the catalyst will have to operate. The dried activated catalyst may be prepared in any desired form, shape and/or size by means of any of the well known methods of crushing, sieving, pressing, etc.

As an alternative procedure, the drying may be stopped at the point in which the catalyst has reached a pasty consistency followed by extrusion of the mass. Such technique enables the production of regular shapes which facilitates the final drying of the catalyst. The catalyst is then activated according to the above described procedure.

Another alternative consists in drying the catalyst by means of the known system of "spray drying." In this way a catalyst is obtained having a shape particularly suited for conducting the process in a fluid bed. For this purpose the reaction product is concentrated until a thick liquid is obtained having a solids content suitable for being fed in the spraying device.

Particular effectiveness and long life of the catalyst is obtained if the catalyst is used admixed with or deposited upon a support. Suitable supports for this purpose have been found to be silica, alumina, Alundum, refractory earths and other similar materials, either in the form of powders of appropriate size or in the form of pellets, small balls and grains, as well as silica or alumina gels.

Amongst the known supports which have been found to be particularly convenient are those which have a so called "open structure," for example, the silica aerogels. The techniques used for placing the catalyst on the supports differ according to the support to be used. These techniques are well known to those skilled in the art, however, to prepare the most effective catalyst suitable for use in the process of this invention, the technique of manufacture, support used, etc., varies solely upon the particular effectiveness in the individual situation. Where a support in the form of a powder is used, the reaction product of the heteropoly salt of ammonia and the compound of the salifying element in the reaction solvent is mixed with the support until a homogeneous mass is obtained and then dried and activated according to the procedures described above.

Similar procedures are also used for depositing the catalyst on a silica gel. In this case the silica gel is prepared separately and then mixed with the reaction product of the heteropoly salt of ammonia and the compound of the salifying element. Subsequently the drying and activation are carried out according to the techniques previously considered. In this specific case, it has been found convenient to add to the mixture of the catalyst and aerogel support, quantities of easily decomposable organic substances, e.g. oils, glycerine, polyvinyl acetate, polyvinylic alcohol, which, as it is known, decompose during the activation, imparting to the catalyst a larger degree of porosity.

As known to those skilled in the art, where a support in the form of pellets, small balls or grains etc. is used, the deposition of the catalyst on the support is preferably carried out by adding the support to a solution of the reaction product of the heteropoly salt of ammonia and the compound of the salifying element, followed by evaporating the solvent, drying and activation.

According to an alternative technique, it is possible to prepare the heteropoly salt of ammonia in the same reaction medium in which said salt is then reacted with the compound of the complexing element. This alternative technique is carried out first by mixing the solution of a salt or of an acid containing the coordinated element with the solution of an acid containing the coordinating element, and then adding, to the mixture thus obtained, the solution of a compound of the complexing element. The catalyst thus obtained is then dried and activated as explained above or, if desired, admixed with or deposited on a support and finally dried and activated as explained above.

While excluding the fact that the following explanatory hypothesis may in some way impair the validity of the results obtained through application of the present invention, it has been theorized that the positive effect of the elements of rare earths may be construed as a modification of the system, wherein said elements exert an influence by enhancing within certain limits, its properties of semiconductor of the n-type. The modification of said system is expressed, as it is known to those skilled in the art, by a variation of the electron-level or Fermi-level.

The importance that the catalyst be of the n-type is related to the hypothesis which has been developed relative to the reaction mechanism as reported in the literature. In fact, some authors (D. J. Hadley, "Chemistry & Industry," February 1961, page 238 and following) have suggested that the conversion from olefin to unsaturated nitrile in the presence of oxygen and ammonia occurs through successive stages, i.e., the olefin is first oxidized to unsaturated aldehyde; which aldehyde then combines with the ammonia to form an imine, which in turn is finally oxidized to a nitrile.

This mechanism assumes that, in order to obtain a good yield of nitriles, ammonia should not be oxidized before its reaction with the aldehyde.

It is also known that the oxidation of the ammonia is complete at low temperatures when it occurs with semiconductors of the p-type (e.g., $Cu_2O$, $NiO$, $CoO$, etc.) whereas its oxidation occurs at considerably higher temperatures with semiconductors of the n-type (for instance $MeO_3$; $B_2O_3$; $WO_3$; $V_2O_5$) (see Emmet, "Catalysis," vol. VII, page 358–59, New York, 1960) in the presence of which ammonia appears therefore considerably more stable. It is theorized that the catalytic action according to the present invention follows this theory of operation.

The catalysts of this invention, while acting as catalysts with a character of enhanced n-type, effectively oxidize the ammonia only at a temperature which is higher than the one at which the oxidation of the imine occurs, in other words, the ammonia under working conditions, is still undecomposed, thus, still available for the desired reaction.

Having thus described the present invention, we now give some illustrative but non-limiting examples of its application.

The percentages given herein are by volume unless otherwise stated. The results indicated in the examples are deduced both from the chromatographic analysis of the gas leaving the reactor and the volumetric and gravimetric quantitative analysis of the condensed products and from the analysis of the uncondensed components by means of Orsat's apparatus.

*Example 1*

A catalyst of the following formula: $Te_{1.2}CeMo_{12}O_{40.4}$ based on tellurium ceriomolybdate is prepared in the following manner:

To a solution of 300 g. of ammonium molybdate in 1000 cc. of $H_2O$ maintained at the boiling point, there are added 500 cc. of a 5% solution of ammonium ceric nitrate. An abundant yellow crystalline precipitate is rapidly formed, which is separated by filtration, washed with a solution of ammonium nitrate and subsequently with methylic alcohol and finally dried in air. A compound of the formula $(NH_4)_8Ce(Mo_2O_7)_6 \cdot 8H_2O$ is obtained.

To 112 g. of this compound in 130 cc. of $H_2O$ and 13 cc. of nitric acid 9.7 g. of $TeO_2$ in a nitric solution and 100 g. of a commercial silica aerogel are added, the mixture is partially evaporated, extruded and then finally dried in an oven at 110° C. for 4 hours; the activation takes place in a muffle furnace by heating at 480° C. for 8 hours. The catalyst thus prepared, suitably subdivided, is placed in a fluid bed reactor.

At a temperature maintained constant at 470° C., there is passed over the catalyst a gaseous mixture consisting of 10.2% of propylene, 71.4% of air, 6.5% of ammonia and 11.9% of steam.

The contact time of the mixture on the catalyst is 0.9 second.

It is found that 66% of the used propylene is converted. The yield in acrylonitrile is 83.8%, in acrolein 6%, in acetonitrile 1.5% with respect to the converted propylene. The total quantity of carbon oxides with respect to the introduced propylene is 2.2%; 87% of the employed ammonia is converted to acrylonitrile.

*Example 2*

A catalyst is prepared from 225.4 g. of ammonium ceriummolybdate in 250 cc. of $H_2O$ and 25 cc. of concentrated nitric acid, where 19.5 g. of tellurium dioxide in nitric solution and then 19.6 g. of commercial silica aerogel are added.

After evaporation to dryness by heating at 110° C. for 4 hours the catalyst is activated in a muffle furnace at 480° C. for 8 hours.

At a constantly maintained temperature of 442° C., over the catalyst there is passed a gaseous mixture consisting of 10.6% of propylene, 76.2% of air, 2.5% of ammonia and 10.7% of steam. With a contact time, as above defined, of 0.6 second, 15.3% of propylene is converted.

70.6% of converted propylene is transformed into acrylonitrile, 6.6% into acrolein and 2.5% into acetonitrile.

*Example 3*

The catalyst of tellurium ceriomolybdate of the following formula: $Te_2CeMo_{12}O_{42}$ is prepared in the following manner. To 145 g. of ammonium-ceric molybdate in 170 cc. of $H_2O$ and 16 cc. of nitric acid, 20.6 g. of tellurium dioxide in nitric solution and 15 g. of a commercial silica aerogel are added.

The mixture is evaporated until dry by heating at 100° for 4 hours and the obtained product is activated in a muffle furnace at 470° C. for 10 hours.

Over the catalyst thus prepared, there is passed a gaseous mixture having the following composition: 9.6% of propylene, 69.2% of air, 6.7% of ammonia and 14.5% of steam, at a temperature of 407° C. and with a contact time of 0.8 second.

The yield in acrylonitrile is 81.7%, in acrolein 10.8% and in carbon oxides 4.5% with respect to the converted propylene.

We claim:
1. Process for converting an olefin selected from the group consisting of propylene and isobutylene to acrylonitrile and methacrylonitrile respectively, comprising contacting a mixture of the olefin, from 0.3 to 2 moles of ammonia and from 0.5 to 2.5 moles of elemental oxygen per mole of olefin in the gaseous phase at a temperature of 300° to 600° C. and for a contact time of 0.05–20 seconds with a heteropolycompound corresponding to the formula:

$$Te_xMe'_yMo_zO_q$$

wherein
Me' is a member selected from the group consisting of cerium, lanthanum and thorium; and
$x$ is a number in the range from 20 to 1800;
$y$ is a number in the range from 1 to 100;
$z$ is a number in the range from 40 to 2400; and
$q$ is a number in the range from 140 to 12,900.

2. Process for converting an olefin selected from the group consisting of propylene and isobutylene to acrylonitrile and methacrylonitrile, comprising contacting a mixture of the olefin, from 0.3 to 2 moles of ammonia and from 0.5 to 2.5 moles of elemental oxygen per mole of olefin in the gaseous phase at a temperature of 300° to 600° C. and a contact time of 0.05–20 seconds with a heteropolycompound corresponding to the formula $Te_xMe'_yMo_zO_q$ wherein:
Me' is a member selected from the group consisting of cerium, lanthanum and thorium and
$x$ is a number in the range from 20 to 1800;
$y$ is a number in the range from 1 to 100;
$z$ is a number in the range from 40 to 2400; and
$q$ is a number in the range from 140 to 12,900;
said heteropoly compound being supported on silica aerogel.

3. Process for converting propylene to acrylonitrile comprising contacting a mixture of the propylene, from 0.3 to 2 moles of ammonia and from 0.5 to 2.5 moles of elemental oxygen per mole of olefin in the gaseous phase at a temperature of 300° to 600° C. and for a contact time of 0.05–20 seconds with a heteropolycompound corresponding to the formula:

$$Te_xCe_yMo_zO_q$$

wherein:
$x$ is a number in the range from 20 to 1800;
$y$ is a number in the range from 1 to 100;
$z$ is a number in the range from 40 to 2400; and
$q$ is a number in the range from 140 to 12,900.

References Cited by the Examiner

UNITED STATES PATENTS

| | | | |
|---|---|---|---|
| 606,693 | 7/1898 | Syssoyeff | 252—462 |
| 1,900,882 | 3/1933 | Lusby | 252—462 |
| 1,900,883 | 3/1933 | Lusby | 252—462 XR |
| 1,937,381 | 11/1933 | Bond | 252—462 |
| 2,378,209 | 6/1945 | Fuller et al. | 252—462 XR |
| 2,481,826 | 9/1949 | Cosby | 260—465.3 |
| 2,734,072 | 2/1956 | Harris | 260—465.3 |
| 2,744,926 | 5/1956 | Koons | 260—465.3 |
| 2,854,473 | 9/1958 | Spaulding et al. | 260—465.3 |
| 2,904,580 | 9/1959 | Idol | 260—465.3 |
| 3,009,943 | 11/1961 | Hadley et al. | 260—465.3 |
| 3,142,697 | 7/1964 | Jennings et al. | 260—465.3 |

FOREIGN PATENTS

| | | |
|---|---|---|
| 635,328 | 1/1962 | Canada. |
| 636,191 | 2/1962 | Canada. |
| 1,255,121 | 1/1961 | France. |

CHARLES B. PARKER, *Primary Examiner.*